US009917617B2

(12) United States Patent
Vanderhaegen et al.

(10) Patent No.: US 9,917,617 B2
(45) Date of Patent: Mar. 13, 2018

(54) RANDOMIZATION OF CROSSTALK PROBING SIGNALS

(71) Applicant: Alcatel-Lucent, Boulogne-Billancourt (FR)

(72) Inventors: Dirk Vanderhaegen, Wemmel (BE); Carl Nuzman, Union, NJ (US); Danny Van Bruyssel, Bonheiden (BE)

(73) Assignee: Provenance Asset Group LLC, Essex, CT (US)

( * ) Notice: Subject to any disclaimer, the term of this patent is extended or adjusted under 35 U.S.C. 154(b) by 90 days.

(21) Appl. No.: 14/910,073

(22) PCT Filed: Aug. 26, 2014

(86) PCT No.: PCT/EP2014/068031
§ 371 (c)(1),
(2) Date: Feb. 4, 2016

(87) PCT Pub. No.: WO2015/028445
PCT Pub. Date: Mar. 5, 2015

(65) Prior Publication Data
US 2016/0191117 A1    Jun. 30, 2016

(30) Foreign Application Priority Data

Aug. 30, 2013  (EP) .................................... 13306184

(51) Int. Cl.
*H04B 3/32*       (2006.01)
*H04M 3/34*       (2006.01)
(Continued)

(52) U.S. Cl.
CPC ............... *H04B 3/32* (2013.01); *H04B 3/487* (2015.01); *H04M 3/007* (2013.01); *H04M 3/34* (2013.01); *H04M 3/304* (2013.01)

(58) Field of Classification Search
None
See application file for complete search history.

(56) References Cited

U.S. PATENT DOCUMENTS

2008/0291989 A1   11/2008  Ashikhmin et al.
2009/0175156 A1    7/2009  Xu
(Continued)

FOREIGN PATENT DOCUMENTS

WO    WO 2012/076598    *  6/2012    .............. H04B 3/32

OTHER PUBLICATIONS

International Search Report PCT/ISA/210 for International Application No. PCT/EP2014/068031 dated Nov. 14, 2014.
(Continued)

*Primary Examiner* — Kodzovi Acolatse
(74) *Attorney, Agent, or Firm* — Dinsmore & Shohl LLP

(57) ABSTRACT

In accordance with an embodiment, the vectoring controller is configured to iterate through successive crosstalk acquisition cycles and, within respective ones of the crosstalk acquisition cycles, to configure sequences of crosstalk probing symbols for transmission over the respective communication lines, to receive sequences of error samples as successively measured by respective receivers coupled to the respective communication lines while the sequences of crosstalk probing symbols are being transmitted, and to determine crosstalk estimates between the respective communication lines based on the sequences of error samples. The vectoring controller is further configured to randomize the successive sequences of crosstalk probing symbols used during the successive crosstalk acquisition cycles, and to iteratively configure the vectoring processor based on the successive crosstalk estimates.

13 Claims, 4 Drawing Sheets

(51) Int. Cl.
*H04B 3/487* (2015.01)
*H04M 3/00* (2006.01)
*H04M 3/30* (2006.01)

(56) References Cited

U.S. PATENT DOCUMENTS

| | | | |
|---|---|---|---|
| 2010/0046684 A1* | 2/2010 | De Lind Van Wijngaarden | H04B 3/487 375/363 |
| 2011/0292783 A1* | 12/2011 | Ahrndt | H04B 3/32 370/201 |
| 2012/0082258 A1* | 4/2012 | Nuzman | H04B 3/487 375/285 |
| 2013/0215935 A1 | 8/2013 | Nuzman et al. | |
| 2013/0251141 A1* | 9/2013 | Mermans | H04B 3/32 379/406.06 |
| 2015/0326380 A1* | 11/2015 | Verbin | H04L 5/1438 370/252 |

OTHER PUBLICATIONS

Written Opinion of the International Searching Authority PCT/ISA/237 for International Application No. PCT/EP2014/068031 dated Nov. 14, 2014.

* cited by examiner

RANDOMIZATION OF CROSSTALK PROBING SIGNALS

CROSS-REFERENCE TO RELATED APPLICATIONS

This is a National Phase of PCT Patent Application No. PCT/EP2014/068031, filed on Aug. 26, 2014 and claims priority to, European Application No. 13306184.6, filed Aug. 30, 2013, the contents of each of which are hereby incorporated by reference in their entirety.

TECHNICAL FIELD OF THE INVENTION

The present invention relates to a method and apparatus for configuring a vectoring processor, the vectoring processor being adapted to mitigate crosstalk between communication lines.

TECHNICAL BACKGROUND OF THE INVENTION

Crosstalk (or inter-channel interference) is a major source of channel impairment for Multiple Input Multiple Output (MIMO) wired communication systems, such as Digital Subscriber Line (DSL) communication systems.

As the demand for higher data rates increases, DSL systems are evolving toward higher frequency bands, wherein crosstalk between neighboring transmission lines (that is to say transmission lines that are in close vicinity over part or whole of their length, such as twisted copper pairs in a cable binder) is more pronounced (the higher frequency, the more coupling).

Different strategies have been developed to mitigate crosstalk and to maximize effective throughput, reach and line stability. These techniques are gradually evolving from static or dynamic spectral management, techniques to multi-user signal coordination (or vectoring).

One technique for reducing inter-channel interference is joint signal preceding: the transmit data symbols are jointly passed through a precoder before being transmitted over the respective communication channels. The precoder is such that the concatenation of the precoder and the communication channels results in little or no inter-channel interference at the receivers.

A further technique for reducing inter-channel interference is joint signal post-processing: the received data symbols are jointly passed through a postcoder before being detected. The postcoder is such that the concatenation of the communication channels and the postcoder results in little or no inter-channel interference at the receivers.

The choice of the vectoring group, that is to say the set of communication lines, the signals of which are jointly processed, is rather critical for achieving good crosstalk mitigation performances. Within a vectoring group, each communication line is considered as a disturber line inducing crosstalk into the other communication lines of the group, and the same communication line is considered as a victim line receiving crosstalk from the other communication lines of the group. Crosstalk from lines that do not belong to the vectoring group is treated as alien noise and is not canceled.

Ideally, the vectoring group should match the whole set of communication lines that physically and noticeably interact with each other. Yet, local loop unbundling (imposed by national regulation policies) and/or limited vectoring capabilities may prevent such an exhaustive approach, in which case the vectoring group would include a sub-set only of all the physically interacting lines, thereby yielding limited vectoring gains.

Signal vectoring is typically performed within an access node, wherein all the data symbols concurrently transmitted over, or received from, all the communication lines of the vectoring group are available. For instance, signal vectoring is advantageously performed within a Digital Subscriber Line Access Multiplexer (DSLAM) deployed at a Central Office (CO) or as a fiber-fed remote unit closer to subscriber premises (street cabinet, pole cabinet, building cabinet, etc). Signal precoding is particularly appropriate for downstream communication (toward customer premises), while signal post-processing is particularly appropriate for upstream communication (from customer premises).

Linear signal precoding and post-processing are advantageously implemented by means of matrix products.

For instance, a linear precoder performs a matrix-product of a vector of transmit frequency samples with a precoding matrix, the precoding matrix being such that the overall channel matrix is diagonalized, meaning the off-diagonal coefficients of the overall channel, and thus the inter-channel interference, mostly reduce to zero. Practically, and as a first order approximation, the precoder superimposes anti-phase crosstalk pre-compensation signals over the victim line along with the direct signal that destructively interfere at the receiver with the actual crosstalk signals from the respective disturber lines.

Similarly, a linear postcoder performs a matrix-product of a vector of received frequency samples with a crosstalk cancellation matrix, the crosstalk cancellation matrix being such that the overall channel matrix is diagonalized too.

It is of utmost importance thus to get an accurate estimate of the actual crosstalk channels in order to appropriately initialize or update the coefficients of the preceding matrix or of the crosstalk cancellation matrix. In the recommendation entitled "Self-FEXT Cancellation (Vectoring) For Use with VDSL2 Transceivers", ref, G.993.5, and adopted by the International Telecommunication Union (ITU) on April 2010, the transceivers are configured to send downstream and upstream pilot sequences over the so-called SYNC symbols, which occur periodically after every 256 DATA symbols.

On a given victim line, error samples, which comprise both the real and imaginary part of the slicer error (or receive error vector) as measured for a specific SYNC symbol on a per tone or group-of-tones basis, are reported to a vectoring controller for further crosstalk estimation. The error samples are correlated with a given pilot sequence transmitted over a given disturber line in order to obtain the crosstalk coefficient from that disturber line. To reject the crosstalk contribution from the other disturber lines, the pilot sequences are made orthogonal to each other, for instance by using Walsh-Haclamard sequences comprising '+1' and '−1' anti-phase symbols. The crosstalk estimates are used for initializing or updating the coefficients of the precoding matrix or of the crosstalk cancellation matrix.

Once new coefficients are in force in the precoder or postcoder, the residual crosstalk continue to be tracked, being on account of a crosstalk channel variation, a residual error in the crosstalk estimates, or an approximation in the determination of the precoder or postcoder coefficients. This is typically achieved by means of iterative update methods that gradually converge towards the optimal precoder or postcoder coefficients.

In the idealized linear model, orthogonal pilot sequences as per G.993.5 recommendation are very effective and always produce accurate and unbiased estimates of the crosstalk channels (initialization) or of the residual crosstalk channels (tracking). Yet, due to non-linear effects, the crosstalk estimates can have an undesired offset (or bias) that drives the precoder or postcoder coefficients away from their optimal values.

In high crosstalk environments for instance, the sum of the crosstalk vectors from all the pilot symbols transmitted over all the disturber lines can be such that the received frequency sample goes beyond the decision boundary of the demodulator. If so, the error vector is reported against the wrong constellation point, yielding an offset in the estimate of the nominal or residual crosstalk channel.

In G.993.5 recommendation, the transmit vector is estimated by the receiver. The set of vectors that can be used as pilots is restricted to two states: a normal state (+1) and an inverted state (−1), which is equivalent to Binary Phase Shift Keying (BPSK) modulation. The receiver determines the expected transmit vector by determining in which half-plane the receive vector is, and by selecting the corresponding constellation point as the most probable transmit vector (minimum distance criteria). This operation is referred to as demapping. Alternatively, Quadrature Phase Shift Keying (QPSK or 4-QAM) constellation grid can be used for pilot detection (although only 2 constellation points out the possible 4 are effectively used), in which case demapping is based on determining the most probable quadrant.

In the event of demapping errors, that is to say when the receiver selects a constellation point different from the transmit, constellation point, the reported slicer error has a completely wrong value. This leads to major inaccuracies in the calculation of the crosstalk coefficients, and thus of the precoder and postcoder coefficients, as the vectoring controller is unaware of the fact that a demapping error has occurred within the receiver.

A possible known solution for dealing with demapping errors would be to use multiple demapping decisions across multiple tones. Given that all probe tones in a particular SYNC symbol are all modulated with the same particular bit from of a given pilot sequence, one can use multiple tones to do a joint estimation. This technique is more robust than the straightforward per-tone decision, but in very low Signal to Noise Ratio (SNR) environments, the receiver could still make a wrong decision. If Frequency Dependent Pilot Sequence (FDPS) is used, the technique can still be applied, using the fact that the pilot values repeat periodically after a given number of tones.

Yet, experiments in the field indicate that at least some receiver models keep on using per-tone decision, with either a BP5K or 4-QAM demodulation grid, thereby increasing the likelihood of demapping errors.

Another example of non-linear effects is signal clipping. Still in high crosstalk environments, the sum of the crosstalk vectors from all the pilot, symbols transmitted over all the disturber lines can be such that the receive frequency sample goes beyond the maximum value supported by the digital processing logic. The error samples would then carry a wrong bounded value that would severely affect and bias the crosstalk estimation process.

Another example of non-linear effects is quantization at various points in the signal path. Quantization makes that these signals can only use certain values. This leads to an offset in the estimate of the residual crosstalk channel.

Using long-term periodic pilots may thus cause biases to build up and may lead to performance degradation over time and instability.

SUMMARY OF THE INVENTION

It is an object of the present invention to alleviate or overcome the aforementioned shortcomings and drawbacks of the known solutions.

In accordance with a first aspect of the invention, a vectoring controller for controlling a vectoring processor that mitigates crosstalk between communication lines of a vectoring group is adapted to iterate through successive crosstalk acquisition cycles and, within respective ones of the crosstalk acquisition cycles, to configure sequences of crosstalk probing symbols for transmission over the respective communication lines, to receive sequences of error samples as successively measured by respective receivers coupled to the respective communication lines while the sequences of crosstalk probing symbols are being transmitted, and to determine crosstalk estimates between the respective communication lines based on the sequences of error samples. The vectoring controller is further adapted to randomize the successive sequences of crosstalk probing symbols used during the successive crosstalk acquisition cycles, and to iteratively configure the vectoring processor based on the successive crosstalk estimates.

In one embodiment of the invention, the successive sequences of crosstalk probing symbols are randomized by successive arbitrary selection of crosstalk probing sequences within a set of mutually orthogonal sequences for modulation of the respective sequences of crosstalk probing symbols.

In one embodiment of the invention, the successive sequences of crosstalk probing symbols are randomized by successive arbitrary rotation in the frequency domain of some or all of the sequences of crosstalk probing symbols.

In one embodiment of the invention, the rotated transmit frequency samples of the successive sequences of crosstalk probing symbols coincide with constellation points of a reference constellation grid used for modulation of the crosstalk probing symbols, thereby yielding a limited set of allowed rotation values.

In one embodiment of the invention, the vectoring controller is further adapted to evenly distribute the allowed rotation values across the respective communication lines of the vectoring group for rotation of the sequences of crosstalk probing symbols.

In one embodiment of the invention, the reference constellation grid is a Binary Phase Shift Keying BPSK constellation grid, and the allowed rotation values are multiples of 180°.

In one embodiment of the invention, the reference constellation grid is a 4-QAM constellation grid, and the allowed rotation values are multiples of 90°.

In one embodiment of the invention, the amount of applied rotation is arbitrarily selected between 0° and 360°, and the vectoring controller is further adapted to send successive rotation information to the receivers indicative of successive rotation values to be applied to receive frequency samples of the respective sequences of crosstalk probing symbols.

In one embodiment, of the invention, the successive sequences of crosstalk probing symbols are randomized by successive arbitrary scaling of some or all of the sequences of crosstalk probing symbols. The vectoring controller is further adapted to send successive scaling information to the receivers indicative of successive scaling values to be applied to receive frequency samples of the respective sequences of crosstalk probing symbols.

In one embodiment of the invention, the error samples are indicative of error vectors between received frequency samples of the crosstalk probing symbols and respective selected constellation points onto which the received frequency samples are demapped.

Such a vectoring controller typically forms part, of an access node that supports wired communication with subscriber devices over an access plant, such as a DSLAM, an Ethernet switch, an edge router, etc, and deployed at a CO or as a fiber-fed remote unit closer to subscriber premises (street cabinet, pole cabinet, building cabinet, etc).

In accordance with another aspect of the invention, a method for controlling a vectoring processor that mitigates crosstalk between communication lines of a vectoring group iterates through successive crosstalk acquisition cycles respectively comprising configuring sequences of crosstalk probing symbols for transmission over the respective communication lines, receiving sequences of error samples as successively measured by respective receivers coupled to the respective communication lines while the sequences of crosstalk probing symbols are being transmitted, and determining crosstalk estimates between the respective communication lines based on the sequences of error samples. The method further comprises randomizing the successive sequences of crosstalk probing symbols used during the successive crosstalk acquisition cycles, and iteratively configuring the vectoring processor based on the successive crosstalk estimates.

Embodiments of a method according to the invention correspond with the embodiments of a vectoring controller according to the invention.

Instead of keeping the pilot signals assigned to the vectored lines unchanged for the full duration of showtime, the vectoring controller introduces randomness or pseudo-randomness between the successive crosstalk acquisition cycles that are used for tracking the residual crosstalk channels. The [pseudo-] randomization is such that a given set of pilots does not re-occur (with high probability, or most of the time) until after many further cycles with different sets of pilots have occurred. This intentional [pseudo-]randomness mitigates the aforementioned bias effects so that, after appropriate smoothing, convergence to the optimal precoder or postcoder coefficients is achieved.

One may for instance reshuffle the pilot sequences assigned to the vectored lines for modulation of the pilot symbols between the successive crosstalk acquisition cycles. The re-shuffling can be random, pseudo-random, or may follow some cyclic; or predefined pattern.

Alternatively or in combination with the pilot sequence re-shuffling, one may vary the phase and/or amplitude of the pilot signals. In order to fulfill the orthogonality requirement, the amount of applied rotation and/or scaling needs to remain constant during the whole length of one crosstalk acquisition cycle.

If the amount of applied rotation and/or scaling is arbitrarily selected, then rotation and/or scaling information need to be sent to the receivers so as the received frequency samples of the pilot, symbols are appropriately re-equalized.

Yet, one may rotate a pilot signal so as the resulting rotated transmit frequency samples still coincide with allowed transmit constellation points. This embodiment is rather advantageous as the receivers do not need to be notified about the amounts of applied rotation, and thus is compatible with the current VDSL2 standard. For instance, if BPSK is used for demodulation of the pilot symbols, then the amount of applied rotation is selected to be either 0° or 180°. If 4-QAM is used instead, then the amount of applied rotation is selected to be either 0°, 90°, 180°, or 270°.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
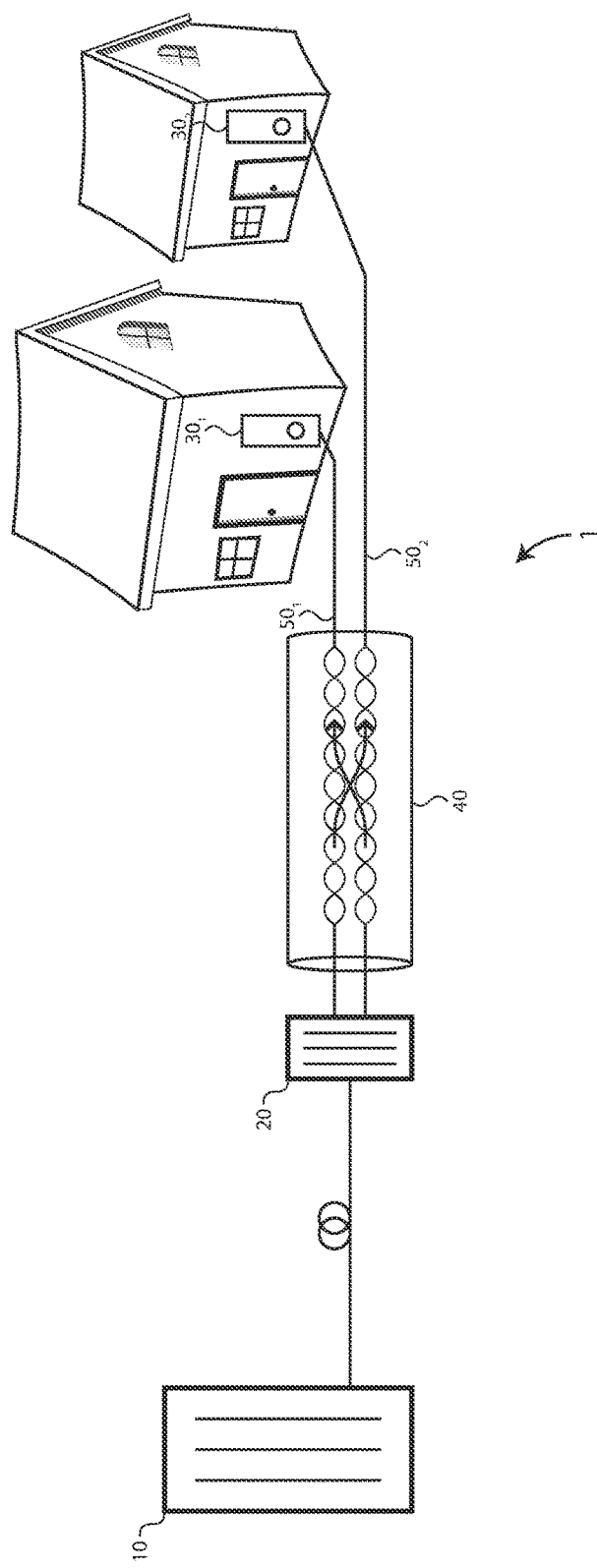
FIG. 1 represents an overview of an access plant.

There is seen in FIG. 1 an access plant 1 comprising a network unit 10 at a CO, a remotely-deployed access node 20 coupled via one or more optical fibers to the network unit 10, and further coupled via a copper loop plant to Customer Premises Equipment (CPE) 30 at various subscriber premises.

The copper loop plant comprises a common access segment 40, wherein the subscriber lines are in close vicinity with each other and thus induce crosstalk into each other, and dedicated loop segments 50 with weak interactions for final connection to the subscriber premises. The transmission media is typically composed of copper Unshielded Twisted Pairs (UTP).

The access node 20 comprises a vectoring processor for jointly processing the data symbols that are being transmitted over, or received from, the loop plant in order to mitigate the crosstalk induced within the common access segment 40 and to increase the communication data rates achievable over the respective subscriber lines.

Figure 2:
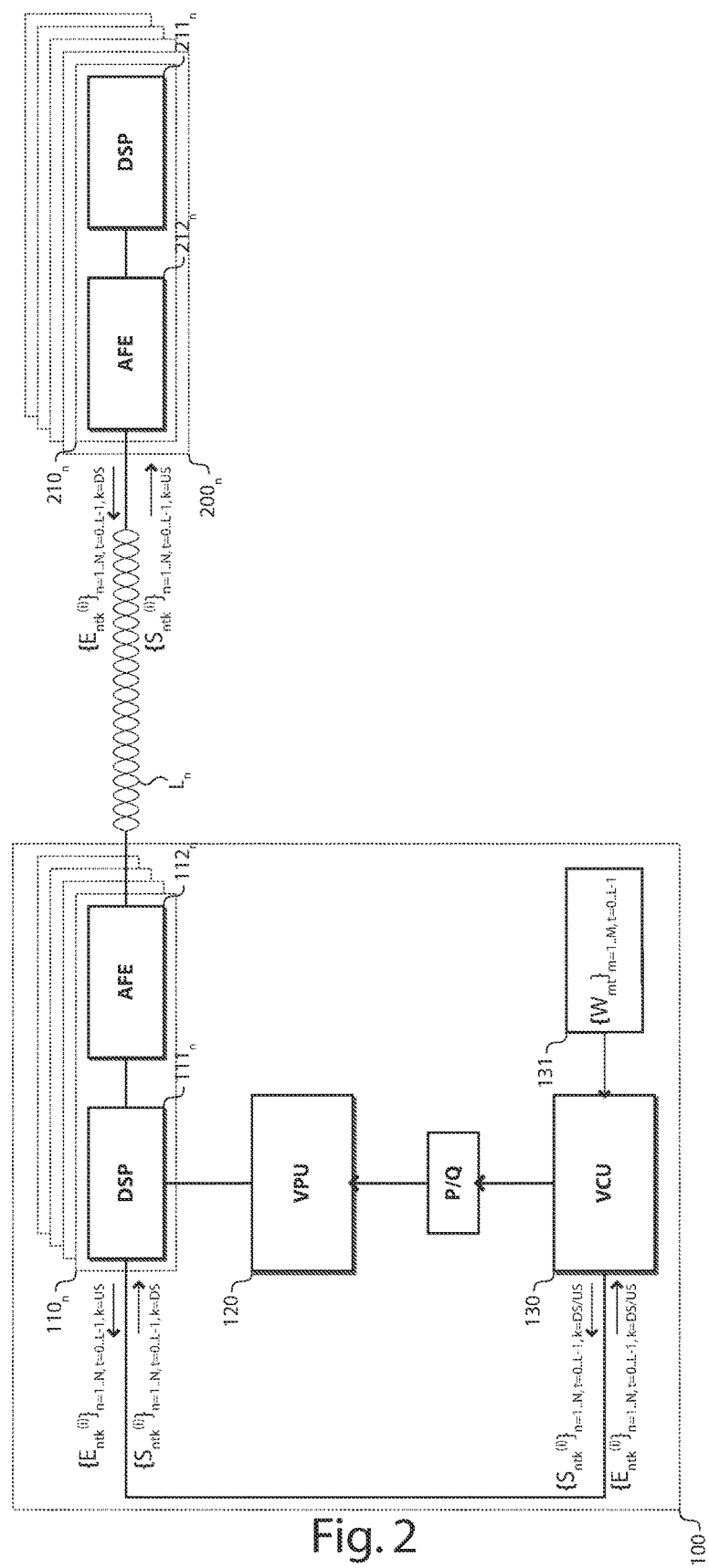
FIG. 2 represents an access node as per the present invention.

There is seen in FIG. 2 an access node 100 as per the present invention coupled to N CPEs $200_1$ to $200_N$ through N respective transmission lines $L_1$ to $L_N$, which are assumed to form part of the same vectoring group.

The access node 100 comprises:
- N DSL transceivers $110_1$ to $110_N$;
- a Vectoring Processing Unit 120 (or VPU); and
- a Vectoring Control Unit 130 (or VCU) for controlling the operation of the VPU 120.

The transceivers 110 are individually coupled to the VPU 120 and to the VCU 130. The VCU 130 is further coupled to the VPU 120.

The transceivers 110 respectively comprise:
- a Digital Signal Processor (DSP) 111; and
- an Analog Front End (AFE) 112.

The CPEs 200 comprise respective DSL transceivers 210. The DSL transceivers 210 respectively comprise:
- a Digital Signal Processor (DSP) 211; and
- an Analog Front End (AFE) 212.

The AFEs 112 and 212 respectively comprise a Digital-to-Analog Converter (DAC) and an Analog-to-Digital Converter (ADC), a transmit filter and a receive filter for confining the signal energy within the appropriate communication frequency bands while rejecting out-of-band interference, a line driver for amplifying the transmit signal and for driving the transmission line, and a Low Noise Amplifier (LNA) for amplifying the receive signal with as little noise as possible.

The AFEs 112 and 212 further comprise a hybrid for coupling the transmitter output to the transmission line and the transmission line to the receiver input while achieving low transmitter-receiver coupling ratio, impedance-matching circuitry for adapting to the characteristic impedance of the transmission line, and isolation circuitry (typically a transformer).

The DSPs 111 and 211 are respectively configured to operate downstream and upstream DSL communication channels.

The DSPs 111 and 211 are further configured to operate downstream and upstream DSL control channels that are used to transport DSL control traffic, such as diagnosis or management commands and responses. Control traffic is multiplexed with user traffic over the DSL channel.

More specifically, the DSPs 111 and 211 are for encoding and modulating user and control data into digital data symbols, and for de-modulating and decoding user and control data from digital data symbols.

The following transmit steps are typically performed within the DSPs 111 and 211:
 data encoding, such as data multiplexing, framing, scrambling, error control encoding, and data interleaving;
 signal modulation, comprising the steps of ordering the carriers according to a carrier ordering table, parsing the encoded bit stream according to the respective bit loadings of the ordered carriers, and mapping each chunk of bits onto an appropriate transmit constellation point (with respective carrier amplitude and phase), possibly with Trellis coding;
 signal scaling;
 Inverse Fast Fourier Transform (IFFT);
 Cyclic Prefix (CP) insertion; and possibly
 time-windowing.

The following receive steps are typically performed within the DSPs 111 and 211:
 CP removal, and possibly time-windowing;
 Fast Fourier Transform (FFT);
 Frequency Equalization (FEQ);
 signal de-modulation and detection, comprising the steps of applying to each and every equalized frequency sample an appropriate constellation grid, the pattern of which depends on the respective carrier bit loading, detecting the expected transmit constellation point and the corresponding transmit bit sequence, possibly with Trellis decoding, and re-ordering all the detected chunks of bits according to the carrier ordering table; and
 data decoding, such as data de-interleaving, error detection and/or correction, de-scrambling, frame delineation and de-multiplexing.

The DSPs 111 are further configured to supply transmit frequency samples to the VPU 120 before Inverse Fast Fourier Transform (IFFT) step for joint signal precoding, and to supply receive frequency samples to the VPU 120 after Fast Fourier Transform (FFT) step for joint signal post-processing.

The DSPs 111 are further configured to receive corrected frequency samples from the VPU 120 for further transmission or detection. Alternatively, the DSPs 111 may receive correction samples to add to the initial frequency samples before further transmission or detection.

The VPU 120 is configured to mitigate the crosstalk induced over the transmission lines. This is achieved by multiplying a vector of transmit frequency samples with a precoding matrix P so as to pre-compensate an estimate of the expected crosstalk (downstream), or by multiplying a vector of received frequency samples with a crosstalk cancellation matrix Q so as to post-compensate an estimate of the incurred crosstalk (upstream).

In the matrix P or Q, a row n represents a particular victim line $L_n$, while a column m represents a particular disturber line $L_m$. At the intersection, the coupling coefficient that should be applied to the corresponding disturber transmit or receive frequency sample for mitigating over the victim line $L_n$ the crosstalk from the disturber line $L_m$. Not all the coefficients of the matrix need to be determined, for instance on account of limited vectoring capabilities first assigned to the strongest crosstalkers, or still for instance due to the fact that some lines do not noticeably interact with each other. The undetermined coefficients are preferably set to 0.

Also, it is noteworthy that a communication line $L_n$ for which vectoring operation is not supported or not enabled, such as a legacy line, yet that still noticeably interferes with other communication lines, is only considered as a disturber line within the vectoring group. The off-diagonal coefficients of the corresponding $n^{th}$ row of the matrix P or Q are thus all set to 0.

The VCU 130 is basically for controlling the operation of the VPU 120, and more specifically for estimating the crosstalk coefficients between the transmission lines of the vectoring group, and for initializing and updating the coefficients of the precoding matrix P and of the crosstalk cancellation matrix Q from the so-estimated crosstalk coefficients.

The VCU 130 is further for controlling the vectoring operation of the transceivers 110 and 210 by appropriately configuring and adjusting the vectoring parameters.

The VCU 130 starts first by configuring the respective downstream pilot sequences for use by the transceivers 110 for modulation of the downstream pilot symbols, and the upstream pilot sequences for use by the transceivers 210 for modulation of the upstream pilot symbols. The same pilot sequence is assumed to be used for both upstream and downstream, although distinct pilot sequences could be configured as well. The pilot sequences assigned to the transmission lines $L_1$ to $L_N$ are denoted as $\{S_{nt}\}_{n=1\ldots N, t=0\ldots L-1}$, wherein t denotes a pilot symbol index and L denotes the length of the pilot sequences. A further distinction is made in FIG. 2 between downstream pilot sequences (k=DS denoting the set of carrier indexes used for downstream communication) versus upstream pilot sequences (k=US denoting the set of carrier indexes used for upstream communication).

The pilot sequences $\{S_{nt}\}_{n=1\ldots N, t=0\ldots L-1}$ are chosen from a set 131 of mutually orthogonal pilot sequences $\{W_{mt}\}_{m=1\ldots M, t=0\ldots L-1}$ of size M. In order to fulfill the orthogonality requirement, the size M of the set of mutually orthogonal pilot sequences 131 shall be greater than or equal to the number N of vectored lines, and less than or equal to the length L of the pilot sequences.

The VCU 130 gathers respective slicer errors $\{E_{nt}\}_{n=1\ldots N, T=0\ldots L-1}$ as measured during the detection of the pilot symbols by the remote transceivers 210 for downstream communication, and by the local transceivers 110 for upstream communication.

The VCU 130 correlates the error samples $\{E_{nt}\}_{t=0\ldots L-1}$ on a respective victim line $L_n$ with the pilot sequence $\{S_{mt}\}_{t=0\ldots L-1}$ transmitted over a respective disturber line $L_m$ in order to estimate the crosstalk or residual crosstalk coefficient from the disturber line $L_m$ into the victim line $L_n$.

The new crosstalk or residual crosstalk estimates are then used for initializing or updating the coefficients of the precoding matrix P or of the crosstalk cancellation matrix Q.

In order to mitigate the non-linear effects that biases the crosstalk estimation process, such as error quantization, error clipping and demapping errors, the VCU 130 introduces some [pseudo-]randomness between the successive crosstalk acquisition cycles that are used for refining the coefficients of the precoding matrix P or of the crosstalk cancellation matrix Q.

In a first embodiment, the VCU 130 re-shuffles the pilot sequences assigned to the transmission lines $L_1$ to $L_N$ between successive crosstalk acquisition cycles.

More specifically, before a first crosstalk acquisition round, the VCU 130 makes a first [pseudo-]random selection $\{S_{nt}^{(0)}\}_{n=1...N, t=0...L-1}$ within the set 131 for assignment to the transmission lines $L_1$ to $L_N$, and configures the transceivers 110 and 210 accordingly. The VCU 130 gathers first slicer errors $\{E_{nt}^{(0)}\}_{n=1...N, t=0...L-1}$ while first pilot symbols modulated with the first pilot sequences $\{S_{nt}^{(0)}\}_{n=1...N, t=0...L-1}$ are being transmitted over the respective transmission lines $L_1$ to $L_N$, and determines first crosstalk estimates $\{\hat{\Theta}_{nm}^{(0)}\}_{n=1...N; m=1...N}$ between the respective transmission lines (or a subset thereof) by correlating the first error samples $\{E_{nt}^{(0)}\}_{n=1...N, t=0...L-1}$ with the respective pilot sequences $\{S_{mt}^{(0)}\}_{m=1...N, t=0...L-1}$.

Before a second subsequent crosstalk acquisition cycle takes place, the VCU 130 makes a second [pseudo-]random selection $\{S_{nt}^{(1)}\}_{n=1...N, t=0...L-1}$ within the set 131 for assignment to the transmission lines $L_1$ to $L_N$, and configures the transceivers 110 and 210 accordingly. The VCU 130 gathers second slicer errors $\{E_{nt}\}_{n=1...N, t=0...L-1}$ while second pilot symbols modulated with the second pilot sequences $\{S_{nt}^{(1)}\}_{n=1...N, t=0...L-1}$ are being transmitted over the respective transmission lines $L_1$ to $L_N$, and determines second crosstalk estimates $\{\hat{\Theta}_{nm}^{(1)}\}_{n=1...N; m=1...N}$ between the respective transmission lines (or a subset thereof) by correlating the first error samples $\{E_{nt}^{(1)}\}_{n=1...N, t=0...L-1}$ with the respective pilot sequences $\{S_{mt}^{(1)}\}_{m=1...N, t=0...L-1}$.

The process may be repeated again and again with further random selections $\{S_{nt}(i)\}_{n=1...N, T=0...L-1}$ to obtain further crosstalk estimates $\{\hat{\Theta}_{nm}^{(i)}\}_{n=1...N; m=1...N}$.

As an alternative to the [pseudo-] random assignment, of the pilot sequences, the VCU 130 could cycle through the set 131 (e.g., first $W_1>L_1$ $W_2>L_2$ ... $W_N>L_N$; next $W_2>L_1$ $W_3>L_2$ ... $W_1>L_N$; etc), or follow any pre-defined pattern. Preferably, such a pattern should go through a relatively large number of cycles before repeating the same assignment.

In a second embodiment, which can be used in combination with the pilot re-shuffling, the VCU 130 alters the phase and/or amplitude of the pilot symbols used during successive crosstalk acquisition cycles.

More specifically, before a first crosstalk acquisition round, the VCU 130 makes a first [pseudo-]random selection $\{S_{nt}^{(0)}\}_{n=1...N, T=0...L-1}$ within the set 131 for assignment to the transmission lines $L_1$ to $L_N$, and configures the transceivers 110 and 210 accordingly. The VCU 130 gathers first, slicer errors $\{E_{nt}^{(0)}\}_{n=1...N, T=0...L-1}$ while first pilot symbols modulated with the first pilot sequences $\{S_{nt}^{(0)}\}_{n=1...N, T=0...L-1}$ are being transmitted over the respective transmission lines $L_1$ to $L_N$, and determines first crosstalk estimates $\{\hat{\Theta}_{nm}^{(0)}\}_{n=1...N; m=1...N}$ between the respective transmission lines (or a subset thereof) by correlating the first error samples $\{E_{nt}\}_{n=1...N, T=0...L-1}$ with the respective pilot sequences $\{S_{mt}^{(0)}\}_{m=1...N, T=0...L-1}$.

Before a second subsequent crosstalk acquisition cycle takes place, the VCU 130 determines a set of complex factors $\{n^{(1)}\}_{n=1...N}$ to apply to the respective pilot sequences $\{S_{nt}^{(0)}\}_{n=1...N, T=0...L-1}$ to yield altered pilot sequences $\{S_{nt}^{(1)}=n^{(1)} \cdot S_{nt}^{(0)}\}_{n=1...N, T=0...L-1}$. If $|n^{(1)}|=1$ then we may say that the pilot symbols are rotated by a given amount in the complex plane. If $n^{(1)}$ is real and $|n^{(1)}| \neq 1$ then the pilot symbols are scaled down or up. The complex factors $\{n^{(1)}\}_{n=1...N}$ to apply to the initial pilot sequences $\{S_{nt}^{(0)}\}_{n=1...N, T=0...L-1}$, or alternatively the altered pilot sequences $\{S_{nt}^{(1)}\}_{n=1...N, T=0...L-1}$, are communicated to the transmitters 110 (downstream) and 210 (upstream) so as they can appropriately alter the corresponding pilot symbols. The VCU 130 gathers second slicer errors $\{E_{nt}\}_{n=1...N, T=0...L-1}$ while second pilot symbols modulated with the altered pilot sequences $\{S_{nt}^{(1)}\}_{n=1...N, T=0...L-1}$ are being transmitted over the respective transmission lines $L_1$ to $L_N$, and determines second crosstalk estimates $\{\hat{\Theta}_{nm}^{(1)}\}_{n=1...N; m=1...N}$ between the respective transmission lines (or a subset thereof) by correlating the first error samples $\{E_{nt}^{(1)}\}_{n=1...N, T=0...L-1}$ with the respective pilot sequences $\{S_{mt}^{(1)}\}_{m=1...N, T=0...L-1}$.

The process may be repeated again and again with further arbitrary sets of complex factors $\{n^{(i)}\}_{n=1...N}$ to obtain further crosstalk estimates $\{\hat{\Theta}_{nm}^{(i)}\}_{n=1...N; m=1...N}$.

The set of complex factors $\{n^{(i)}\}_{n=1...N}$ can be determined [pseudo-]randomly, for example with unit magnitude and phase uniformly distributed between 0° and 360°. If so, the complex factors $n^{(i)}$, or alternatively the altered pilot sequences $\{S_n^{(i)}\}_{n=1...N}$, need to be communicated to the respective receivers 210 (downstream) and 110 (upstream) so as they can appropriately equalize the so-altered pilot symbols and measure meaningful slicer errors for further reporting.

Alternatively, the complex factors $n^{(i)}$ may be chosen from a restricted set of allowed values in order to avoid ad-hoc equalization of the pilot symbols at the receivers. Indeed, if BPSK is used then the complex factors $n^{(i)}$ are chosen from the set $\{1; -1\}$; if 4-QAM is used then the complex factors $n^{(i)}$ are chosen from the set $\{+1; +j; -1; -j\}$. If so, the rotated transmit frequency samples still coincide with valid transmit constellation points, and the complex factors do not need to be communicated to the receivers for ad-hoc equalization.

Also, the allowed rotation values need to be evenly distributed among the transmission lines $L_1$ to $L_N$. For instance, if BPSK is used, it is beneficial if approximately half of the transmission lines are assigned the value +1, meaning their pilot signal is left unchanged, while half of the transmission lines are assigned the value −1, meaning their pilot signal is rotated by 180°. If 4-QAM is used, it is beneficial if approximately a quarter of the transmission lines are assigned the value +1 (0°), a quarter the value j (+90°), a quarter the value −1 (+180°), and a quarter the value −j (+270°).

The successive crosstalk estimates $\{\hat{\Theta}_{nm}^{(i)}\}_{n=1...N; m=1...N}$ are then used for configuring the VPU 120. As the estimation errors caused by non-linear effects in each cycle depend on the pilot sequences used, and as the pilot sequences used in successive cycles are randomized, the estimation errors obtained in successive cycles are expected to exhibit low correlation or be uncorrelated. After a certain number of iterative updates, the impacts of the aforementioned estimation errors are thus expected to be progressively annihilated, ultimately yielding unbiased precoder or postcoder coefficients that achieves near-optimal bit rates over the transmission lines $L_1$ to $L_N$.

The VCU 130 may use different methods to configure the VPU 120.

For instance, the VCU 130 computes a weighted combination of the first, second and further crosstalk estimates to yield an average crosstalk estimate, which is next used to initialize or to refine the precoding matrix P or the crosstalk cancellation matrix Q.

Alternatively, the VCU 130 acquires the first crosstalk estimates and initializes the precoding matrix P or the crosstalk cancellation matrix Q based on these first crosstalk estimates. The VCU 130 may then use the second and further crosstalk estimates to successively refine the coefficients of the precoding matrix P or of the crosstalk cancellation matrix Q. The first crosstalk estimates is typically obtained during an initialization phase (init), while the second and further crosstalk estimates are obtained during an active communication phase (show time).

Still alternatively, the VCU 130 may use the first, second and further crosstalk estimates to successively refine the coefficients of the precoding matrix P or of the crosstalk cancellation matrix Q in successive steps. The first, second and further crosstalk estimates are typically obtained during an active communication phase (show time).

The pilot signals do not need to be changed after each and every pilot cycle (a pilot cycle is meant to be the transmission of L consecutive pilot symbols). For instance, on account of the incurred signaling overload needed for re-configuring the upstream pilot signals, the VCU 130 may wait a given number of pilot cycles with a given set of pilots configured before switching to another set of pilots.

Also, not all pilot cycles are used for crosstalk estimation. For instance, on account of the incurred processing load, the VCU 130 may skip a few pilot, cycles without estimating the residual crosstalk.

Also, the VCU 130 may perform more than one crosstalk acquisition cycles and determine more than one crosstalk estimates while a given set of pilots is configured, and use all these crosstalk estimates to configure the VPU 120.

We now give a mathematical model for a DSL system as per FIG. 2, and we derive an algorithm for estimating the crosstalk or residual crosstalk coefficients, and for appropriately configuring the VPU 120.

Channel Model

Consider a system with N DSL lines $L_1$ to $L_N$ in a vectoring group. Communication takes place on K DMT tones, labeled 0 through K-1. The tones may be thought as independent channels; we focus attention on a specific tone k. In general we will use a subscript k to denote the tone index whenever necessary. Both downstream and upstream operations are considered.

In a frequency-domain model of the system, let complex signals x be the vector of complex signals to be sent downstream on lines $L_1$ to $L_N$ (on a particular tone k), where is a diagonal matrix with entries nn=n, where $n^2$ is the transmit power on line $L_n$, and where $x_n$ is a unit power complex signal to be transmitted downstream onto line $L_n$. Then, in the absence of vectoring, the received signal is given by:

$$\tilde{r} = H\Lambda x + \tilde{z},$$

wherein H is a N×N channel matrix, with element $H_{nn}$ representing direct channel gain and element $H_{nm}$ representing crosstalk channel gain from line $L_m$ into line $L_n$, and wherein $\tilde{z}$ represents background noise.

If we apply precoding with precoding matrix P=I+C, we have:

$$\tilde{r} = \tilde{R}\Lambda x + \tilde{z},$$

wherein $\tilde{R}=H(I+C)$ is the residual channel matrix.

We decompose the channel matrix as:

$$H = D(I+G),$$

wherein D is a diagonal matrix of direct gains $D_{nn}=H_{nn}$, and wherein G is the receiver-referred relative crosstalk channel matrix with entries $G_{nm}=H_{nm}/H_{nn}$ for m≠n and $G_{nn}=0$.

Prior to slicing the received signal on a fixed grid, the received signal passes through a Frequency domain Equalizer (FEQ), and the transmit power is compensated for. The result of these two operations is the normalized received signal:

$$r = \Lambda^{-1}D^{-1}\tilde{r} = \Lambda^{-1}R\Lambda x + z = x + \Lambda^{-1}\Theta\Lambda x + z,$$

wherein $R=D^{-1}\tilde{R}=(I+G)(I+C)$ and $z=\Lambda^{-1}D^{-1}\tilde{z}$ are the normalized residual channel matrix and background noise respectively, and wherein =R−I=G+C+GC is the normalized residual crosstalk channel matrix.

During SYNC symbols, the transmitted values $x_n$ can be estimated with high reliability by the receiver, and subtracted from the received signal to form an error signal. In vector form the error signal is given by:

$$e = r - x = \Lambda^{-1}\Theta\Lambda x + z \quad (1).$$

When error feedback is operational, these complex error values are sent back to the vectoring controller, and can be used to estimate the normalized residual crosstalk channel matrix, which we wish to drive to zero.

Now let complex signals x be the vector of complex signals to be sent upstream on lines $L_1$ to $L_N$ (on a particular tone k), where is a diagonal matrix with entries nn=n, where $n^2$ is the transmit power on line $L_n$, and where $x_n$ is a unit power complex signal to be transmitted upstream onto line $L_n$. Then, in the absence of vectoring, the received signal is given by:

$$\tilde{r} = H\Lambda x + \tilde{z},$$

wherein H is a N×N channel matrix, with element $H_{nn}$ representing direct channel gain and element $H_{nm}$ representing crosstalk channel gain from line $L_m$ into line $L_n$, and wherein $\tilde{z}$ represents background noise.

In the upstream direction, we decompose the channel matrix as:

$$H = (I+\tilde{G})D,$$

wherein D is a diagonal matrix of direct gains $D_{nn}=H_{nn}$, and wherein $\tilde{G}$ is the transmitter-referred relative crosstalk matrix with entries $\tilde{G}_{nm}=H_{nm}/H_{mm}$ for m≠n and $\tilde{G}_{nn}=0$.

The use of different notations downstream and upstream are useful. One important property is that with these notations, the relative crosstalk coefficients are typically much smaller than unity, even when lines of different lengths are present. In downstream, the channels $H_{nm}$ and $H_{nn}$ both have the same propagation distance; the distance is a function of the receiver. In upstream on the other hand, it is the channels $H_{nm}$ and $H_{mm}$ that cover the same propagation distance; here the distance is a function of the transmitter.

We apply postcoding with postcoding matrix Q=I+C, followed by frequency equalization (FEQ), represented by a diagonal matrix F, and power normalization. The receiver adapts F to be the inverse of the diagonal of the postcoded channel (I+C)H, which in case of small crosstalk, yields F≈D$^{-1}$. The compensated signal after these three operations is thus given by:

$$y = \Lambda^{-1} F(I+C)\tilde{r} = \Lambda^{-1} FRD\Lambda x + z,$$

wherein R=(L+C)(L+$\tilde{G}$) is the normalized residual channel matrix, and wherein the noise term is z=$\Lambda^{-1}$F(I+C)$\tilde{z}$≈$\Lambda^{-1}$D$^{-1}\tilde{z}$.

The noise term depends on the postcoder setting, but this dependence can be ignored if the coefficients of C are small relative to unity, as should be the case in practice.

In general, we define =R−I to be the normalized residual crosstalk channel matrix. We wish to drive this residual crosstalk to zero.

During SYNC symbols, the transmitted values $X_n$ can be estimated with high reliability by the receiver, and subtracted from the compensated signal r to form an error signal. In vector form the error signal is given by:

$$e = y - x = \Lambda^{-1} F\Theta D\Lambda x + z \quad (2).$$

When error feedback is operational, these complex error values are forwarded to the vectoring controller, and can be used to estimate the residual crosstalk channel.

Crosstalk Estimation Algorithm

Because the mapping from the residual crosstalk channel to the error samples e is very similar in downstream (1) and upstream (2), the remainder of this description is largely common for upstream and downstream. However, it should be kept in mind that the quantity z has a slightly different meanings in upstream versus downstream. Also, where receiver referred relative crosstalk G is referenced when describing downstream communication, it should be replaced by the transmitter-referred relative crosstalk $\tilde{G}$ when describing upstream communication.

For pilot-based crosstalk estimation, we send pilot sequences on the pilot symbols. That is, define a N×L pilot matrix S, where $S_{nt}$ is a binary value '+1' or '−1', that will modulate the complex symbol sent, on line $L_n$ at time t. The sequence is repeated with period L, that is the value sent at time t is $S_n$ with =t mod L. We choose S to be orthogonal, meaning that SS$^T$==LI$_N$, that is L times the N×N identity matrix.

Denote by a=(1+j)/√2 the 4-QAM constellation point 00, scaled to unit power, with −a the point 11. The values sent on the SYNC symbol period t are then $x_n(t) = aS_{nt}$.

The L pilot symbols of a given pilot sequence may also be rotated and/or scaled by multiplication with a complex factor $_n$, in which case the transmitted value is $X_n(t) = a \,_n S_{nt}$.

For downstream, the error symbols received on all lines over L consecutive SYNC symbols can be written in N×L matrix notation as:

$$E = aA^{-1}\Lambda^{-1}\Theta\Lambda AS + Z,$$

wherein A is a diagonal matrix with entries $A_{nn}=_n$,
wherein A$^{-1}$ is the ad-hoc equalization for the received pilot symbols performed at the receiver.

If n=+/−1, then the equalization factor A$^{-1}$ is no longer required and can be omitted. In that case, the receivers estimate AS directly without using knowledge of A, and the error symbols are:

$$E = a\Lambda^{-1}\Theta\Lambda AS + Z$$

Correlating the sequence of error samples received on each line with each of the pilot sequences can be represented in matrix notation by right-multiplying the error matrix E by the transpose of the pilot, sequence. In case of ad-hoc equalization, the resulting unnormalized correlations are of the form:

$$U = ES^T = aA^{-1}\Lambda^{-1}\Theta\Lambda ASS^T + ZS^T = aLA^{-1}\Lambda^{-1}\Theta\Lambda A + ZS^T.$$

Note that this correlation operation only involves adding and subtracting complex error samples—there are no multiplications required. Finally, the unnormalized correlations are normalized to obtain unbiased estimates of the residual crosstalk:

$$\hat{\Theta}_{nm} = U_{nm}\left(\frac{\alpha_n}{\alpha_m}\right)\left(\frac{\sigma_n}{\sigma_m}\right)\left(\frac{1}{aL}\right) = \Theta_{nm} + w_{nm}, \quad (3)$$

wherein the noise term is:

$$W_{nm} = \left(\frac{\alpha_n}{\alpha_m}\right)\left(\frac{\sigma_n}{\sigma_m}\right)\left(\frac{1}{aL}\right)\sum_{t=0}^{L-1} z_{nt} S_{mt}.$$

A quick calculation shows that the variance of the crosstalk estimate is:

$$\text{var}[\hat{\Theta}_{nm}] = E[|W_{nm}|^2] = \left(\frac{|\alpha_n|^2}{|\alpha_m|^2}\right)\left(\frac{\sigma_n^2}{\sigma_m^2}\right)\frac{E[|Z_n|^2]}{L}.$$

For upstream now, the error symbols received on lines $L_1$ to $L_n$ over L consecutive SYNC symbols can be written in N×L matrix notation as:

$$E = aA^{-1}\Lambda^{-1}F\Theta D\Lambda AS + Z,$$

assuming that the receiver knows and performs ad-hoc equalization of A.

Otherwise, if the receivers directly estimate AS without using knowledge of A, the error feedback is:

$$E = a\Lambda^{-1}F\Theta D\Lambda AS + Z.$$

Correlating the sequence of error samples received on each line with each of the pilot sequences can be represented in matrix notation by right-multiplying the error matrix E by the transpose of the pilot sequence. In case of ad-hoc equalization, the resulting unnormalized correlations are of the form:

$$U = ES^T = aA^{-1}\Lambda^{-1}F\Theta D\Lambda ASS^T + ZS^T = aLA^{-1}\Lambda^{-1}F\Theta D\Lambda A + ZS^T.$$

Finally, the unnormalized correlations are normalized to obtain unbiased estimates of the residual crosstalk:

$$\hat{\Theta}_{nm} = U_{nm}\left(\frac{\alpha_n}{\alpha_m}\right)\left(\frac{\sigma_n}{F_{nn} H_{mm} \sigma_m}\right)\left(\frac{1}{aL}\right) = \Theta_{nm} + w_{nm}, \quad (4)$$

wherein the noise term is:

$$W_{nm} = \left(\frac{\alpha_n}{\alpha_m}\right)\left(\frac{\sigma_n}{F_{nn} H_{mm} \sigma_m}\right)\left(\frac{1}{aL}\right)\sum_{t=0}^{L-1} z_{nt} S_{mt}.$$

A quick calculation shows that the variance of the crosstalk estimate is:

$$\mathrm{var}[\hat{\Theta}_{nm}] = E[|W_{nm}|^2] = \left(\frac{|\alpha_n|^2}{|\alpha_m|^2}\right)\left(\frac{\sigma_n^2}{|F_{nn}|^2|H_{mm}|^2\sigma_m^2}\right)\frac{E[|Z_n|^2]}{L}.$$

Precoder and Postcoder Configuration

The residual crosstalk estimates $\{\hat{\Theta}_{nm}^{(i)}\}_{n=1\ldots N; m=1\ldots N}$, which are obtained as per equation (3) or (4) during successive crosstalk acquisition cycles, are next used to iteratively update the precoding matrix P or the crosstalk cancellation matrix Q.

Let $P^{(i)}$ denote the precoding matrix during the $i^{th}$ crosstalk acquisition cycle.

Ideally, the new precoding matrix $P^{(i+1)}$ shall be determined from the estimate $\hat{\Theta}^{(i)}$ of the normalized residual crosstalk channel matrix using the following matrix inversion formula:

$$P^{(i+1)} = I + C^{(i+1)} = P^{(i)} R^{(i)-1} = P^{(i)} (I+\Theta^{(i)})^{-1}.$$

Indeed, the new normalized channel matrix will become:

$$(I+G)P^{(i+1)} = (I+G)P^{(i)}R^{(i)-1} = (I+G)(I+C^{(i)})(I+C^{(i)})^{-1}(I+G)^{-1} = I.$$

Although ideal precoder coefficients are obtained after one iteration, this involves inverting lot of large matrices.

As a first-order approximation, one may subtract the estimated residual crosstalk from the precoder coefficients as follows:

$$P^{(i+1)} = I + C^{(i+1)} = P^{(i)} - \hat{\Theta}^{(i)},$$

thereby yielding:

$$(I+G)P^{(i+1)} = (I+G)(P^{(i)} - \hat{\Theta}^{(i)}) =$$
$$(I+G)(I+C^{(i)} - \hat{\Theta}^{(i)}) = I + \Theta^{(i)} - \hat{\Theta}^{(i)} - G\hat{\Theta}^{(i)} \simeq I - G\hat{\Theta}^{(i)}.$$

As the normalized crosstalk coefficients are expected to be low compared to unity, the residual crosstalk $\Theta^{(i+1)} = \Theta^{(i)} - \hat{\Theta}^{(i)} - G\hat{\Theta}^{(i)} \approx -G\hat{\Theta}^{(i)}$ gets smaller and smaller after each iteration, and the overall channel matrix is expected to converge towards the identity matrix I.

Alternatively, one may use a multiplicative update as per US patent, application entitled "Multiplicative Updating of Precoder or Postcoder Matrices for Crosstalk Control in a Communication System", and published on Aug. 2, 2012 with publication number US 2012/0195183.

The idea is to use an auxiliary matrix that is an approximation of the inverse of the resultant channel matrix $R^{(i)}$, and that is formed by subtracting the estimate $\hat{\Theta}^{(i)}$ of the normalized residual crosstalk channel matrix from the identity matrix I. This multiplicative update process therefore makes the approximation $R^{(i)-1} \approx I - \hat{\Theta}^{(i)}$ and then multiplies the current precoder matrix $P^{(i)}$ on the right by $I - \hat{\Theta}^{(i)}$. The updated precoder matrix $P^{(i+1)}$ is then given by:

$$P^{(i+1)} = I + C^{(i+1)} = P^{(i)}(I - \hat{\Theta}^{(i)}),$$

and so the updated overall normalized channel matrix is given by:

$$(I+G)P^{(i+1)} = (I+G)P^{(i)}(I - \hat{\Theta}^{(i)}) =$$
$$(I+G)(I+C^{(i)})(I - \hat{\Theta}^{(i)}) = I + \hat{\Theta}^{(i)} - \hat{\Theta}^{(i)} - \hat{\Theta}^{(i)2} \simeq I - \hat{\Theta}^{(i)2}.$$

The entries of the normalized residual channel matrix are normally much smaller than the entries of the normalized crosstalk channel matrix G, and so the error term —$^2$ is expected to be much smaller than the error term of a typical additive update — G.

One may also introduce respective weights in the iterative update algorithm so as to smooth the convergence process and avoid any transient impairment in case the newly estimated residual crosstalk coefficients are severely biased (e.g., on account of demapping errors).

Alternative update methods could be used as well, such as the Least Mean Square (LMS) adaptive algorithm or alike.

A similar derivation is obtained for updating the crosstalk cancellation matrix Q.

Figure 3:
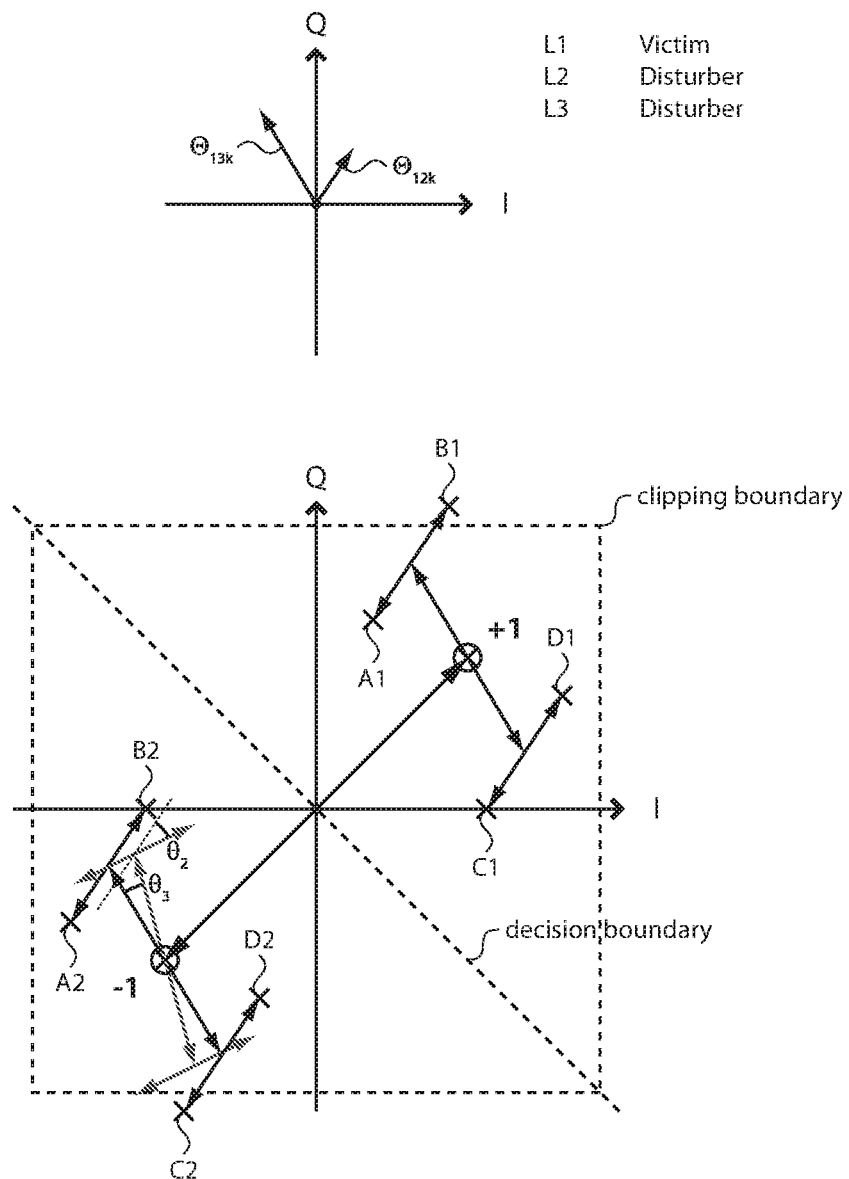
FIG. 3 is an illustration of the technical effects of the present invention in the In-Phase/Quadrature (I/Q) plane.

There is seen in FIG. 3 further details as per how randomization of the pilot sequences mitigates the non-linear effects that bias the crosstalk estimation process.

It is assumed that line $L_1$ is the victim line, and that lines $L_2$ and $L_3$ are dominant disturbers for the line $L_1$.

The pilot sequences are assumed to be of length 4. The constant, sequence [+1, +1, +1, +1] is not used as it yields poor estimates in the presence of constant biases. The three remaining orthogonal sequences are [+1, −1, +1, −1], [−1, −1, +1, +1] and [+1, −1, −1, +1]. Let us assume that the lines $L_1$, $L_2$ and $L_3$ are initially assigned the pilot sequences $S_1^{(0)} = [+1, −1, +1, −1]$, $S_2^{(0)} = [−1, −1, +1, +1]$ and $S_3^{(0)} = [+1, −1, −1, +1]$ during a first crosstalk acquisition cycle.

The top I/Q plot shows the normalized residual crosstalk coefficients $_{12k}$ and $_{13k}$ from lines $L_2$ and $L_3$ respectively into line $L_1$ for a given tone k and during a given crosstalk acquisition cycle. This residual crosstalk is due to several factors, including estimate errors in equations (3) and (4), non-ideal matrix inversion for the determination of the precoding matrix P or the crosstalk cancellation matrix Q, the inherent inaccuracy of the digital arithmetic, as well as any of the aforementioned non-linear effects that may bias the crosstalk estimates.

The bottom I/Q plot shows the frequency samples of a sequence of pilot symbols as received over line $L_1$ at frequency index k during the same crosstalk acquisition cycle (after channel equalization and power normalization). Assuming there is no other noise source, the received frequency samples go through positions A1, C2, D1 and B2 depending on whether +1 or −1 have been transmitted over the respective lines $L_1$, $L_2$ and $L_3$. As one can see, some specific combination, presently −1 on line $L_1$, −1 on line $L_2$ and −1 on line $L_3$, yields signal clipping (position C2 is beyond the I/Q signal boundaries). Also, as the received samples repeatedly go through a few positions only (4 out of the 8 possible positions), there can be some artifacts arising from the quantization of these particular points.

In order to mitigate these effects, one could randomize the pilot signals during a subsequent crosstalk acquisition cycle.

For instance, one could apply 180° rotation to one or more pilot sequences (inc. the victim line), and keep the other pilots unchanged (0°). Presently, during another crosstalk acquisition cycle, the pilot sequences of lines $L_3$ is inverted, while the pilot sequences of line $L_1$ and $L_2$ are left unchanged, thereby yielding the following pilot assignment $S_1^{(1)} = [+1, −1, +1, −1]$, $S_2^{(1)} = [−1, −1, +1, +1]$ and $S_3^{(1)} = [−1, +1, +1, −1]$. The received frequency samples now go through different positions, presently positions C1, A2, B1 and D2, thereby mitigating the quantization artifacts.

In order to mitigate the signal clipping that occurs when position C2 is hit, one may apply an ad-hoc rotation $_2$ to the pilot sequence of line $L_2$, thereby yielding $S_2^{(2)} = [−e^{j\;2}, −e^{j\;2}, +e^{j\;2}, +e^{j\;2}]$, and a rotation $_3$ to the pilot sequence of line $L_3$, thereby yielding $S_3^{(2)}=[+e^{j\pi/3}, -e^{j\pi/3}, -e^{j\pi/3}]$, while the pilot sequence of line $L_1$ is left unchanged, i.e. $S_1^{(2)}=[+1, -1, +1, -1]$. The rotated crosstalk signals have been plotted as gray vectors, and as one can see, the signal clipping is suppressed or at least mitigated.

The present invention is a simple mechanism that avoids constant offsets while being (partly) compatible with the current VDSL2 standard. The present invention helps to obtain good stable vectored performance in the presence of high crosstalk which would otherwise be impaired by demapping errors, clipping errors, or other non-linear artifacts. The need for complex processing to identify and correct demapping errors is avoided, or at least reduced.

Figure 4A:
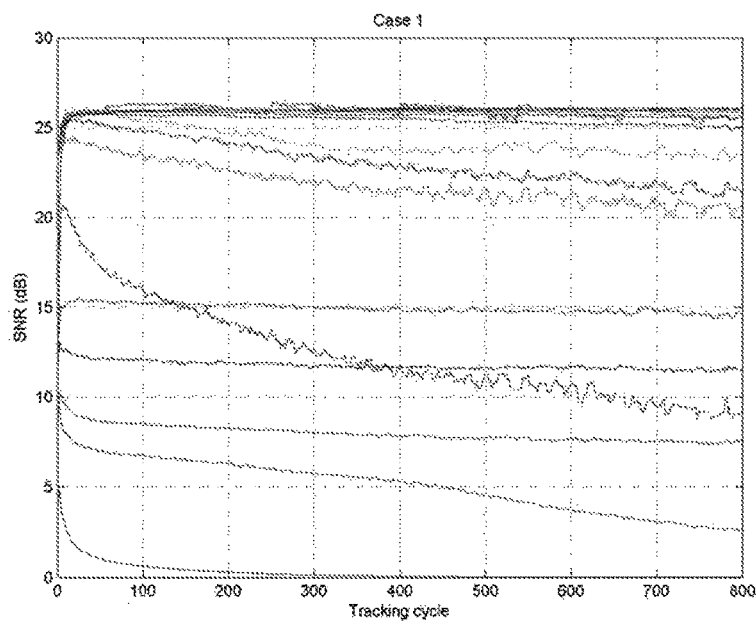
FIGS. 4A and 4B are simulation plots for the achieved SNR without and with pilot randomization respectively.

There is seen in FIG. 4A a first, simulation plot, wherein the achieved SNR has been plotted on each of 20 active lines at the end of each tracking cycle, and wherein the same pilot assignment is used across all crosstalk acquisition cycles. In a tracking cycle, the residual crosstalk is estimated, and the precoder is updated accordingly. As one can see, communication lines are gradually affected by degradation, driven by demapping errors in the CPE and other artifacts that cause bias in the residual crosstalk estimates and drive the precoder coefficients away from their optimal values.

Figure 4B:
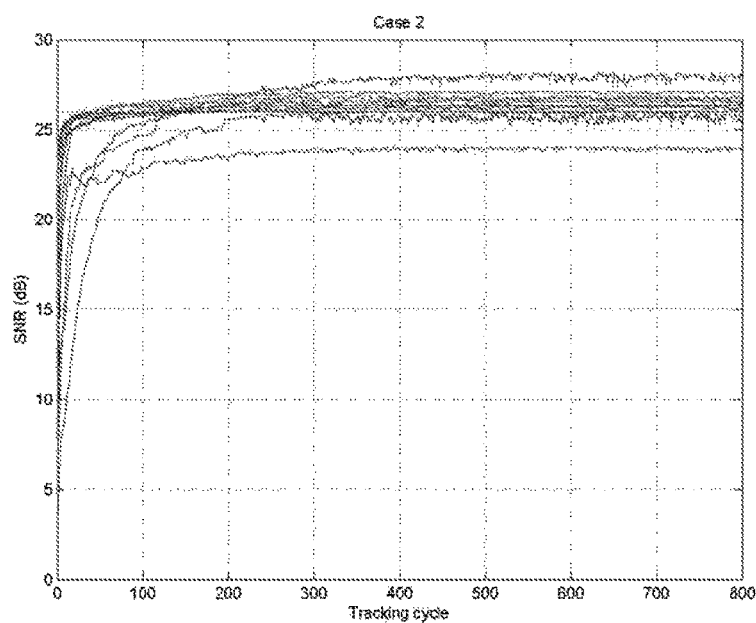

There is seen in FIG. 4B a second simulation plot, wherein the achieved SNR has been plotted on each of 20 active lines at the end of each tracking cycle, and wherein the pilots are now randomly re-shuffled between successive crosstalk acquisition cycles. As one can see, all lines are stable now. Although demapping errors occur initially, the bias introduced is different in each tracking cycle, and so the system converges to the correct solution.

It is to be noticed that the term 'comprising' should not be interpreted as being restricted to the components listed thereafter. Thus, the scope of the expression 'a device comprising components A and B' should not be limited to devices consisting only of components A and B. It means that with respect to the present invention, the relevant components of the device are A and B.

It, is to be further noticed that the term 'coupled' should not be interpreted as being restricted to direct connections only. Thus, the scope of the expression 'a device A coupled to a device 6' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A vectoring controller for controlling a vectoring processor that mitigates crosstalk between communication lines of a vectoring group, the vectoring controller comprising:
   a memory storing computer-readable instructions; and
   a processor configured to execute the computer-readable instructions to,
      iterate through successive crosstalk acquisition cycles,
      successively configure sequences of crosstalk probing symbols within respective successive crosstalk acquisition cycles for transmission over respective communication lines,
      receive sequences of error samples as successively measured by respective receivers coupled to the respective communication lines while the successively configured sequences of crosstalk probing symbols are being transmitted,
      successively determine crosstalk estimates between the respective communication lines based on the sequences of error samples,
      randomize the successively configured sequences of crosstalk probing symbols between the respective successive crosstalk acquisition cycles, to mitigate bias in the successively determined crosstalk estimates due to non-linear effects including one or more of quantization artifacts, signal clipping, and demapping errors, by at least one of
         reshuffling the sequences of crosstalk probing symbols assigned to the respective communication lines between the respective successive crosstalk acquisition cycles, and
         varying at least one of a phase and an amplitude of the sequences of crosstalk probing symbols assigned to the respective communication lines between the respective successive crosstalk acquisition cycles, and
      iteratively configure the vectoring processor to mitigate crosstalk between the respective communication lines by adjusting vectoring parameters based on the successively determined crosstalk estimates.

2. The vectoring controller according to claim 1, wherein the successively configured sequences of crosstalk probing symbols are randomized by successive arbitrary selection of crosstalk probing sequences within a set of mutually orthogonal sequences for modulation of respective sequences of crosstalk probing symbols.

3. The vectoring controller according to claim 1, wherein the successively configured sequences of crosstalk probing symbols are randomized by successive arbitrary rotation in the frequency domain of some or all of the sequences of crosstalk probing symbols.

4. The vectoring controller according to claim 3, wherein rotated transmit frequency samples of the successively configured sequences of crosstalk probing symbols coincide with constellation points of a reference constellation grid used for modulation of crosstalk probing symbols, thereby yielding a limited set of allowed rotation values.

5. The vectoring controller according to claim 4, wherein the processor is further configured to execute the computer-readable instructions to evenly distribute the allowed rotation values across the respective communication lines of the vectoring group for rotation of the sequences of crosstalk probing symbols.

6. The vectoring controller according to claim 4, wherein the reference constellation grid is a Binary Phase Shift Keying (BPSK) constellation grid, and the allowed rotation values are multiples of 180°.

7. The vectoring controller according to claim 4, wherein the reference constellation grid is a 4-QAM constellation grid, and the allowed rotation values are multiples of 90°.

8. The vectoring controller according to claim 3, wherein an amount of applied rotation is arbitrarily selected between 0° and 360°, and the processor is further configured to execute the computer-readable instructions to send successive rotation information to the respective receivers indicative of successive rotation values to be applied to receive frequency samples of respective sequences of crosstalk probing symbols.

9. The vectoring controller according to claim 1, wherein the successively configured sequences of crosstalk probing symbols are randomized by successive arbitrary scaling of some or all of the sequences of crosstalk probing symbols, and the processor is further configured to execute the computer-readable instructions to send successive scaling information to the respective receivers indicative of successive scaling values to be applied to receive frequency samples of respective sequences of crosstalk probing symbols.

10. The vectoring controller according to claim 1, wherein the sequences of error samples are indicative of error vectors between receive frequency samples of respective sequences of crosstalk probing symbols and respective selected constellation points onto which the receive frequency samples are demapped.

11. An access node for providing broadband communication services to subscribers, and comprising the vectoring controller according to claim 1.

12. The access node according to claim 11, wherein the access node is a Digital Subscriber Line Access Multiplexer (DSLAM).

13. A method for controlling a vectoring processor that mitigates crosstalk between communication lines of a vectoring group, the method comprising:
iterating through successive crosstalk acquisition cycles;
successively configuring sequences of crosstalk probing symbols within respective successive crosstalk acquisition cycles for transmission over respective communication lines;
receiving sequences of error samples as successively measured by respective receivers coupled to the respective communication lines while the successively configured sequences of crosstalk probing symbols are being transmitted;
successively determining crosstalk estimates between the respective communication lines based on the sequences of error samples;
randomizing the successively configured sequences of crosstalk probing symbols between the respective successive crosstalk acquisition cycles, to mitigate bias in the successively determined crosstalk estimates due to non-linear effects including one or more of quantization artifacts, signal clipping, and demapping errors, by at least one of
reshuffling the sequences of crosstalk probing symbols assigned to the respective communication lines between the respective successive crosstalk acquisition cycles, and
varying at least one of a phase and an amplitude of the sequences of crosstalk probing symbols assigned to the respective communication lines between the respective successive crosstalk acquisition cycles; and
iteratively configuring the vectoring processor to mitigate crosstalk between the respective communication lines by adjusting vectoring parameters based on the successively determined crosstalk estimates.

* * * * *